Nov. 9, 1926.
A. OSTERMAN
TRAILER HITCH
Filed July 11, 1923
1,606,379
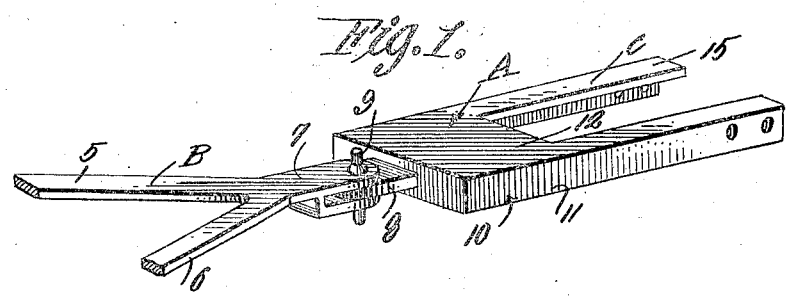
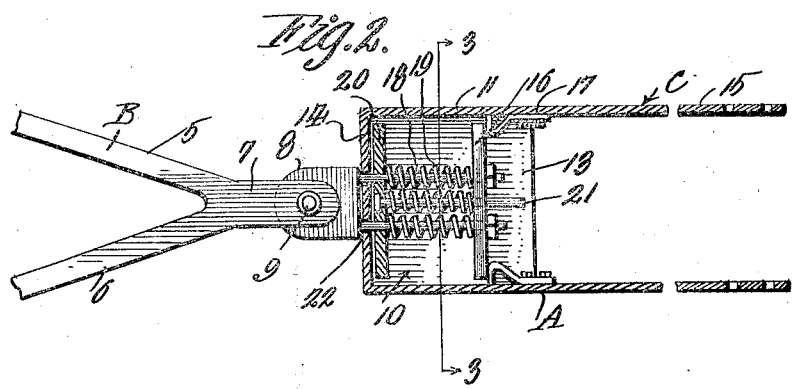
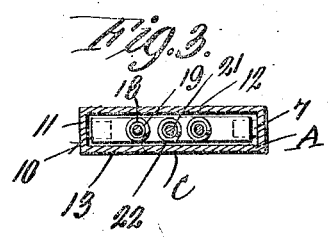
WITNESSES
Inventor
ANTON OSTERMAN
Attorney Patented Nov. 9, 1926.

1,606,379

UNITED STATES PATENT OFFICE.

ANTON OSTERMAN, OF NOBLE, ILLINOIS.

TRAILER HITCH.

Application filed July 11, 1923. Serial No. 650,921.

This invention relates to means for connecting an automobile with a trailer and the primary object of the present invention is the provision of an improved hitch, which will facilitate the connecting of a trailer with an automobile and which will permit the easy following of the trailer in rear of the automobile around curves and the like.

Another prime object of the invention is the provision of a hitch for connecting a trailer with an automobile, which will eliminate all shock incident to the starting of the trailer and automobile and prevent undue stress from being placed upon the trailer.

A further object of the invention is the provision of a two-part hitch, one part being adapted to be connected with the trailer and the other part with the automobile, the parts being detachably connected by means of a hinge bolt or pin, permitting the swinging of the trailer and automobile in relation to each other, when the trailer and automobile were connected.

A still further object of the invention is to provide a novel hitch of the above character, which is durable and efficient in use, one that is simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a fragmentary perspective view of the improved hitch.

Figure 2 is a longitudinal section taken horizontally through the improved hitch, and Figure 3 is a transverse section through the improved hitch taken on the line 3—3 of Figure 2.

Referring to the drawings in detail, wherein similar reference character designate corresponding parts throughout the several views the letter A generally indicates the improved hitch, which embodies the sections B and C, which are pivotally and detachably connected together, by means, which will be hereinafter more fully described.

Either the section B or C can be connected with the motor vehicle or trailer, but I prefer to connect the section C with the leading or pulling motor vehicle and B with the trailer.

The section B, which is preferably connected with the trailer comprises a pair of converging arms 5 and 6, which terminate at their forward ends in a yoke-shaped head 7 for receiving the rearwardly extending stud 8 carried by the section C. The head or yoke 7 and the stud or ear 8 are provided with aligned recesses for detachably receiving the connecting pin 9 and by this construction, it can be seen that swinging movement between the sections is permitted. The arms 5 and 6 are adapted to be connected with the front axle of the trailing vehicle or with any preferred parts thereof. Suitable clamps or any means can be utilized for attaching the arms to the trailer.

The section C, which as stated, is adapted to be connected to the rear end of the leading or pulling motor vehicle comprises a housing 10 consisting of side longitudinally extending walls 11, top and bottom walls 12 and 13 and a rear wall 14. The side walls 11 and the top wall 12 are extended to provide parallel disposed attaching arms 15 which are angled-shaped in cross section and these arms 15 are adapted to be connected with the motor vehicle at any preferred point.

The housing 10 receives the slide block 16 which is adapted to normally engage stops 17 secured to the side walls 11 of the housing. This slide block 16 carries the rearwardly extending bolts 18 which slidably extend through suitable openings formed in the rear wall 14 and these bolts 18 are formed integral with the stud or ear 8 as can be clearly seen by referring to Figure 2 of the drawings. Expansion coil springs 19 are coiled about the bolts 18 and bear respectively against the slide block 16 and a block 20, which is disposed in the housing at the rear end thereof. The block 20 carries a centrally disposed bolt 21 which extends toward the forward end of the housing and this central bolt slidably extends through the slide block 20 and has coiled about the same an expansion spring 22.

In operation of the improved hitch, it can be seen that the same will permit the ready connection of a trailer with a motor vehicle and permit the readily tracking of the trailer behind the motor vehicle. It is also to be noted, that owing to the connection of the means of mounting the attaching ear 8 with the housing, that all sudden shocks will be alleviated incident to the starting of the leading or pulling motor vehicle.

While I have shown three coil springs, it is to be understood that more or less springs can be utilized according to the size of the load and the trailer, which is to be connected with the pulling vehicle.

Changes in detail may be made without departing from the spirit or the scope of this invention.

What I claim as new is:

1. A hitch for connecting a trailer with a motor vehicle comprising a pair of sections adapted to be secured to the trailer and motor vehicle, one section including a pair of diverging legs, an extension head formed on the extremity of the said legs, the other section including a housing, extension arms formed on the housing, an ear position in the front of said housing, a pair of bolts secured to the said ear and extending through suitable openings into the said housing, a slide block secured to the inner extremities of the said bolts, springs positioned about the bolts between the said slide block and casing head, means for preventing displacement of the sliding block, a bolt positioned in the central portion of the sliding block, a spring positioned on the last mentioned bolt, and means for pivotally connecting the said sections.

2. A device of the character described comprising a pair of draft sections, one section including a housing, means for connecting the said housing in association with a vehicle, a slide block arranged for longitudinal sliding movement in the housing, a connecting member projecting from the outer portion of the housing, means for rigidly securing the said connecting member with the slide block, compression springs disposed between the slide block and the outer end of the housing tending to normally maintain the slide block in a separated position relative to the outer end of the housing, and a co-acting section pivotally connected with the connecting member for attachment with a trailer.

3. A device of the character described comprising a pair of co-acting draft sections, one section including a housing, forwardly extending arms formed on the housing and adapted for attachment with a vehicle, a block mounted for longitudinal slidable movement in the housing, a connecting ear disposed rearwardly of the housing, a connecting member secured to the said ear and block to rigidly connect the same, a plurality of compression springs disposed between the slidable block and the outer wall of the housing tending to maintain the slide block and ear in retracted position, and a co-acting section pivotally connected with the rearwardly projecting ear adapted for connection with a trailer.

In testimony whereof I affix my signature.

ANTON OSTERMAN.